United States Patent [19]

Lübbehusen et al.

[11] Patent Number: 4,861,200
[45] Date of Patent: Aug. 29, 1989

[54] APPARATUS FOR PNEUMATICALLY CONVEYING BULK MATERIAL

[75] Inventors: Paul Lübbehusen, Ravensburg; Norbert Eberhard, Ertingen; Hans Hoppe, Vogt, all of Fed. Rep. of Germany

[73] Assignee: Waeschle Maschinenfabrik GmbH, Ravensburg, Fed. Rep. of Germany

[21] Appl. No.: 190,105

[22] Filed: May 4, 1988

[30] Foreign Application Priority Data

May 5, 1987 [DE] Fed. Rep. of Germany ....... 3714924

[51] Int. Cl.[4] .............................................. B65G 53/66
[52] U.S. Cl. ...................................... 406/14; 406/11; 406/12; 406/95
[58] Field of Search ................. 406/11, 14, 15, 19, 406/45, 85, 93–95, 12

[56] References Cited

U.S. PATENT DOCUMENTS

| | | | |
|---|---|---|---|
| 3,295,896 | 1/1967 | Hurtig et al. | 406/15 |
| 4,389,143 | 6/1983 | Nadin et al. | 406/45 X |
| 4,515,503 | 5/1985 | Snowdon | 406/11 |
| 4,715,748 | 12/1987 | Krambrock | 406/14 X |

FOREIGN PATENT DOCUMENTS

| | | | |
|---|---|---|---|
| 2219199 | 10/1973 | Fed. Rep. of Germany | 406/95 |
| 3323739 | 1/1985 | Fed. Rep. of Germany | 406/14 |
| 3435907 | 4/1986 | Fed. Rep. of Germany | . |
| 212526 | 12/1983 | Japan | 406/94 |
| 18635 | 1/1986 | Japan | 406/95 |
| 2085388 | 4/1982 | United Kingdom | 406/14 |

Primary Examiner—Joseph F. Peters, Jr.
Assistant Examiner—James M. Kannofsky
Attorney, Agent, or Firm—Henry M. Feiereisen

[57] ABSTRACT

An apparatus for pneumatically conveying bulk material includes a conveyor line for transporting the bulk material and a secondary line which carries clean gas and is multiply connected via branch line and a plurality of check valves with the conveyor line for allowing introduction of clean gas when the pressure difference as measured between adjacent pressure transmitters exceeds a predetermined value. Adjacent pressure transmitters are operatively connected with a differential pressure switch which actuates a valve regulating the flow of clean gas through the branch line. The differential pressure switch opens the valve as soon as the pressure difference exceeds the predetermined value.

2 Claims, 3 Drawing Sheets

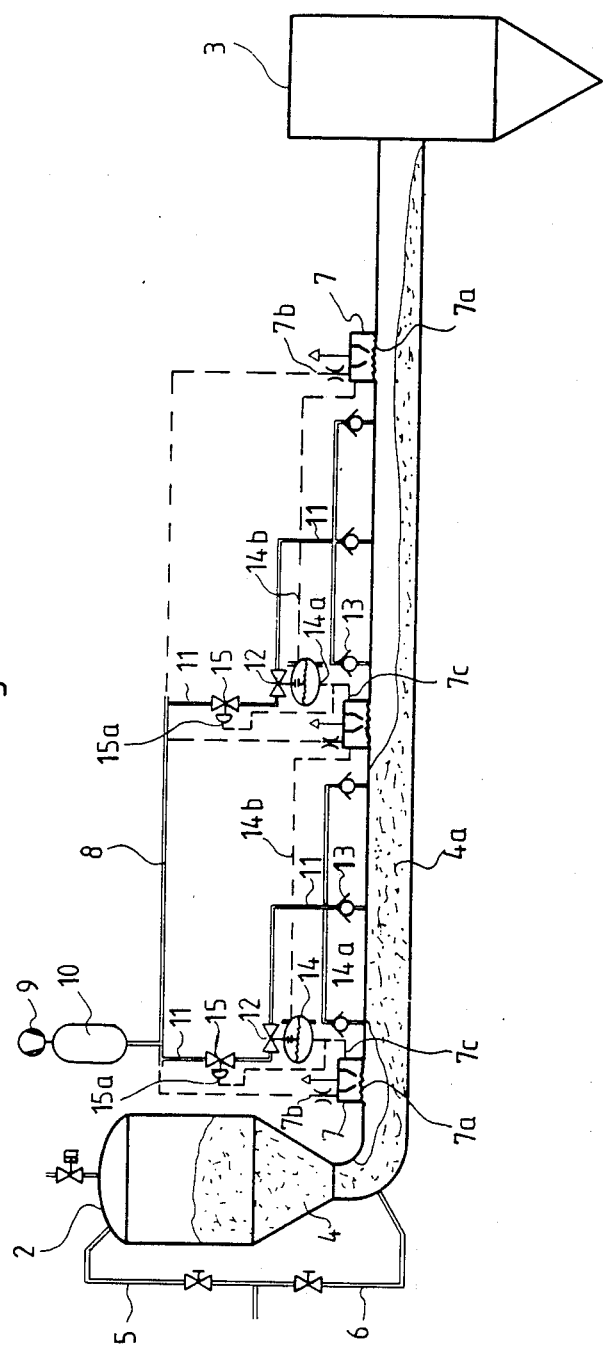

4,861,200

APPARATUS FOR PNEUMATICALLY CONVEYING BULK MATERIAL

BACKGROUND OF THE INVENTION

The invention refers to an apparatus for pneumatically conveying bulk material, and in particular to an apparatus including a conveyor line for transporting the bulk material and a secondary line which guides a clean gas and is connected via spaced valves with the conveyor line for introducing clean gas into the conveyor line as soon as the pressure differential as measured between adjacent measuring elements which are spaced along the conveyor line exceeds a predetermined value.

An apparatus of this kind is known from the German publication DE-OS No. 34 35 907. Each of the measuring elements is connected to the secondary line and contains a pressure-reducing valve which is controlled by a diaphragm acted upon by the pressure prevailing in the conveyor line. The pressure-reducing valve supplies a clean-air receiver in which the same pressure prevails as in the conveyor line and which is connected in the area of the next succeeding measuring element in downstream direction with the conveyor line via a line and a check valve.

In case a clogging is forming within the conveyor line, the pressure difference between the clean-air receiver of the next succeeding measuring element in upstream direction and the conveyor line in the area of the associated check valve exceeds the closing force of its spring so that the check valve opens and allows introduction of additional clean air into the conveyor line.

In case of need, such an apparatus allows a simultaneous supply of clean air into the conveyor line at several points thereof. However, the measuring elements which include complicated specially designed valves must be spaced from each other at distances which correspond at a maximum to the length of a clogged area and thus must be provided in great numbers in order to ensure a dissolution of a clogged area. In addition, only a limited overpressure according to the pressure difference between adjacent measuring elements is available for dissolving the clogged area. A further drawback resides in the fact that in case a check valve fails to operate, bulk material may penetrate the associated measuring element thus impairing functioning thereof.

SUMMARY OF THE INVENTION

It is thus an object of the present invention to provide an improved apparatus for pneumatically conveying bulk material obviating the afore-stated drawbacks.

This object and others which will become apparent hereinafter are attained in accordance with the present invention by spacing a plurality of pressure transmitters along the conveyor line so as to define various sections between adjacent pressure transmitters and connecting each section of the conveyor line via a branch line and a valve with a clean gas carrying secondary line wherein adjacent pressure transmitters are operatively connected with a differential pressure switch which actuates the valve in dependence on the pressure difference between adjacent pressure transmitters. Suitably, the secondary line is connected via a plurality of spaced check valves with the conveyor line so that clean gas can simultaneously be introduced at various points into the conveyor line.

According to the teachings of the invention, the pressure differential measurement is separated from the introduction of clean gas from the secondary line into the conveyor line. Therefore, the secondary line can carry clean gas at a pressure which can be substantially above the pressure within the conveyor line also at the beginning of the conveyor line so that a clogged area can effectively and unimpededly be dissolved by introducing clean gas.

According to a further feature of the invention, each branch line incorporates prior to the valve a pressure reducing valve which is connected to the associated pressure transmitter. In this manner, th increased pressure level in the branch lines between adjacent two pressure transmitters adjusts automatically to the pressure conditions in the conveyor line. This is advantageous when transporting different bulk material through the conveyor line and thus requiring varying pressures.

The pressure transmitters are conventional parts whose control air port may be selectively connected with the secondary line or with a separate compressed-air line.

BRIEF DESCRIPTION OF THE DRAWING

The above and other objects, features and advantages of the present invention will now be described in more detail with reference to the accompanying drawing in which:

FIG. 4 is a schematically simplified view of a third embodiment of an apparatus for pneumatically conveying bulk material in accordance with the present invention.

DETAILED DESCRIPTION OF PREFERRED EMBODIMENT

Figure 1:
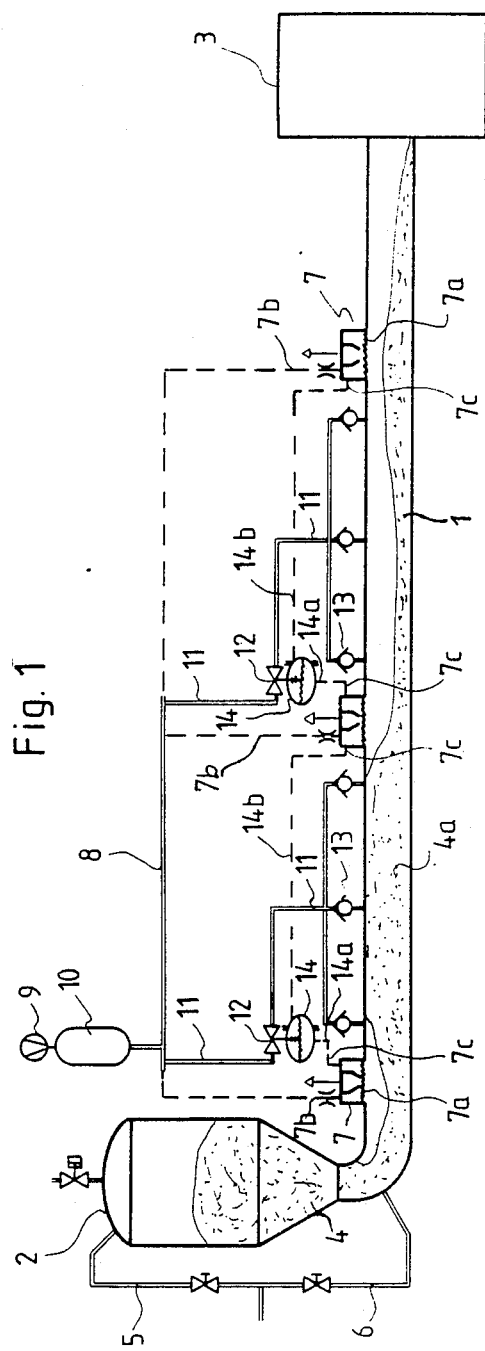
FIG. 1 is a schematically simplified view of a first embodiment of an apparatus for pneumatically conveying bulk material in accordance with the present invention.

Referring now to the drawing, and in particular to FIG. 1, there is shown a schematically simplified view of a first embodiment of an apparatus for pneumatically conveying bulk material in accordance with the present invention. The apparatus includes a conveyor line 1 which connects a feed container 2 with a separator 3. The container 4 is charged with bulk material 4, and air is admitted from atop to force the bulk material 4 through the outlet of the funnel-shaped bottom of the container 2. A further line 6 communicates with the outlet of the container 2 to introduce compressed air for transporting the bulk material 4 through the conveyor line 1.

The conveyor line 1 is divided in sections by spaced pressure transmitters 7 which are depicted only schematically. Each pressure transmitter 7 includes a diaphragm 7a, a control air port 7b and two pressure measurement ports 7c except for the first upstream and last downstream pressure transmitter which have only one pressure measurement port 7c. The pressure at each pressure measurement port 7c is equal to or at least proportional to the pressure prevailing in the conveyor line 1 at the conveying air side of the diaphragm 7a.

Extending parallel to the conveyor line 1 is a secondary line 8 which is supplied with a clean gas e.g. compressed air at constant pressure by means of e.g. a fan 9 and an air chamber 10. Branching off the secondary line 8 are branch lines 11 which contain a valve 12 and are connected to a respective section of the conveyor line 1 between two successive pressure transmitters 7 via check valves 13 which allow a flow of clean gas only in direction to the conveyor line 1 but not vice versa. As shown in FIG. 1, three check valves 13 are provided and spaced along the pertaining section of the conveyor line 1, however, any other suitable number of check valves 13 is certainly feasible.

Each valve 12 is operatively connected to and controlled by a differential pressure switch 14 which is depicted only schematically in the drawing. Each differential pressure switch 14 communicates via respective connections 14a, 14b with the pressure measurement port 7c of the adjacent pressure transmitter 7 and with the pressure measurement port 7c of the pressure transmitter 7 next succeeding in downstream direction. As shown in the drawing, the connections 14a, 14b may be compressed-air lines, however, they may also be electric lines in case the pressure transmitters provide an electric signal in correspondence with the pressure measurement. Likewise, the differential pressure switches 14 may actuate the valves 12 in a mechanical or electrical manner wherein in the latter case, the valves 12 are magnetic valves.

During normal operation, the bulk material 4 is discharged through the outlet of the container 2 into the conveyor line 1 and transported by the compressed air supplied through line 6. The valves 12 close the flow of compressed air through the branch lines 11. In case the bulk material 4 accumulates within the conveyor line 1 so as to clog the latter as indicated at 4a in FIG. 1, the pressure drops within the conveyor line 1 downstream of the clogged area 4a. Thus, the diaphragm 7a of the pressure transmitter 7 following the clogged area 4a is deflected and the pressure difference between the pressure transmitters 7 before and after the clogged area 4a is registered by the respective differential pressure switch 14 which actuates the associated valve 12 so that compressed air flows from the secondary line 8 through the respective branch line 11 and opens the check valves 14 to flow into the conveyor line 1 for dissolving the clogged area 4a.

Figure 2:
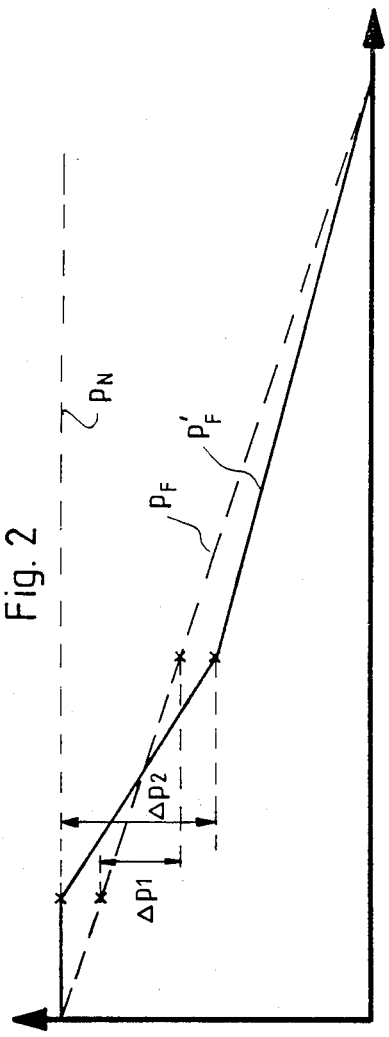
FIG. 2 is a graphical illustration of the pressure plotted over the length of the respective conveyor lines.

Turning now to FIG. 2, there is shown a graphical illustration of the pressure prevailing in the various lines and plotted over the length of the lines in connection with the nonlimiting example of FIG. 1 in which clogging of the bulk material 4 occurred in the area 4a. The pressure is indicated on the ordinate while the length of the lines is indicated on the abscissa.

In the graphical illustration of FIG. 2, $P_N$ represents the constant pressure of the clean gas within the secondary line 8 while $P_F$ represents the pressure within the conveyor line 1 in dependence on the length as measured from the charging point and at normal (idealized) conveying conditions. It has been arbitrarily assumed that the initial pressure $P_F$ is equal to $P_N$. However, $P_N$ may be selected considerably higher than $P_F$. $P_F$ represents the pressure graph in the conveyor line 1 during formation of a clogged area. Accordingly, the pressure difference between the pressure transmitters 7 for the pertaining section of the conveyor line 1 is increased from value $\Delta p1$ prevailing at normal operation to a value $\Delta p2$. The differential pressure switches 14 are adjusted to respond as soon as $\Delta p2 > \Delta p1$. Thus, the respective valve 12 and the check valves 13 open so that clean gas e.g. compressed air is introduced via the branch line 11 into the conveyor line 1 to dissolve the clogged area 4a.

To further improve the operation and to take into account the type of bulk material, it is certainly feasible to have the differential pressure switches responding only at a certain pressure difference i.e. the pertaining valves are actuated only when $\Delta p2$ exceeds $\Delta p1$ by a preset amount.

Figure 3:
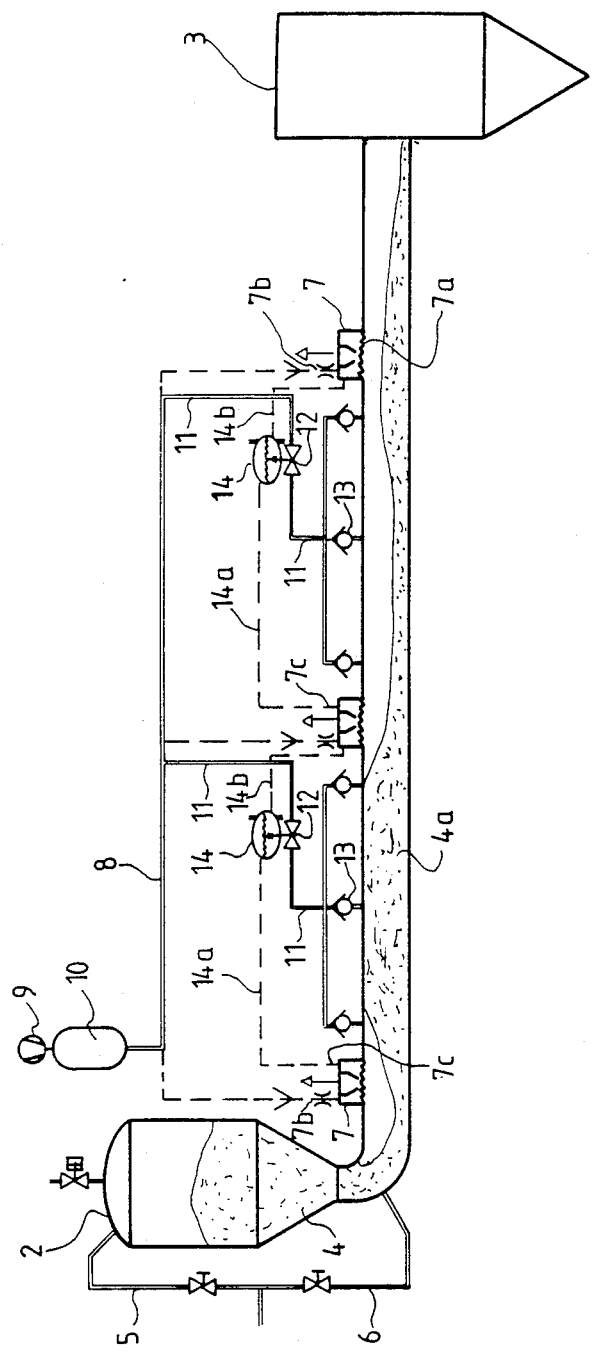
FIG. 3 is a schematically simplified view of a second embodiment cf an apparatus for pneumatically conveying bulk material in accordance with the present invention.

Referring now to FIG. 3, there is shown a schematically simplified view of a second embodiment of an apparatus for pneumatically conveying bulk material in accordance with the present invention. In FIG. 3, same reference numerals have been used for corresponding parts as shown in FIG. 1. The second embodiment differs from the apparatus of FIG. 1 solely in the relative arrangement of the pressure transmitters 7, valves 12, check valves 13 and differential pressure switches 14 relative to a section of the conveyor line 1 and is illustrated to show that the relative arrangement is of no relevance for the operation of the apparatus.

FIG. 4 shows a schematically simplified view of a third embodiment of an apparatus for pneumatically conveying bulk material in accordance with the present invention. In FIG. 4, same reference numerals have been used for corresponding parts as shown in FIG. 1. The third embodiment differs from the apparatus according to FIG. 1 only in the provision of a pressure reducing valve 15 before the valves 12 in the branch lines 11. Each pressure reducing valve 15 has a control port 15a which is connected to the pressure measurement port 7c of the associated pressure transmitter 7. Accordingly, the pressure prevailing in the branch lines 11 downstream of the pressure reducing valves 15 and thus the pressure of the clean gas introduced into the conveyor line in case of need is increased by a predetermined amount in comparison to the pressure prevailing in the conveyor line 1. This means that the overpressure in the branch lines 11 adjusts automatically to the pressure as measured by the pressure transmitter 7 in the conveyor line 1 so that approximately a same increased pressure level continuously prevails in the branch lines 11 regardless as to whether an easily transportable material is concerned which requires only a low pressure for transport or a material which is difficult to transport and thus requires a high pressure.

While the invention has been illustrated and described as embodied in an Apparatus for Pneumatically Conveying Bulk Material, it is not intended to be limited to the details shown since various modifications and structural changes may be made without departing in any way from the spirit of the present invention.

What is claimed as new and desired to be protected by Letters Patent is set forth in the appended claims:

We claim:

1. Apparatus for pneumatically conveying bulk material; comprising:
   a conveyor line for transporting the bulk material;
   a secondary line carrying clean gas;
   pressure measuring means for determining the pressure in said conveyor line, said pressure measuring means including pressure transmitters spaced along said conveyor lines so as to divide said conveyor line into sections;

connecting means for providing a multiple communication between said secondary line and each section of said conveyor line; and control means for regulating the flow of clean gas through said connecting means in dependence on the pressure difference between adjacent pressure transmitters, said control means including a differential pressure switch operatively connected to pressure measurement ports of adjacent pressure transmitters, and a valve contained in said connecting means and being actuated by said differential pressure switch when said pressure differential exceeds a predetermined value so as to allow clean gas to be introduced through said connecting means into said conveyor line, said connecting means further including a pressure reducing valve interposed between said secondary line and said valve and having a control port connected with the pressure measuring port of the associated one of said pressure transmitters.

2. Apparatus as defined in claim 1 wherein said connecting means includes a branch line and a plurality of check valves accommodated in said branch line and spaced along each section of said conveyor line so as to allow introduction of clean gas at various points.

* * * * *